United States Patent [19]
Cory

[11] 3,924,715
[45] Dec. 9, 1975

[54] CLUTCH-BRAKE UNIT
[75] Inventor: Halsey W. Cory, Fairfield, Ohio
[73] Assignee: Force Control Industries, Inc., Hamilton, Ohio
[22] Filed: Apr. 17, 1974
[21] Appl. No.: 461,504

[52] U.S. Cl. .......................... 192/18 A; 192/113 B
[51] Int. Cl.² ......................................... F16D 67/06
[58] Field of Search ...................... 192/18 A, 113 B

[56] References Cited
UNITED STATES PATENTS
2,935,889  5/1960  Adams et al. ............... 192/113 X
3,638,773  2/1972  Lewis .......................... 192/113 B X Primary Examiner—Benjamin W. Wyche
Attorney, Agent, or Firm—Jacox & Meckstroth

[57] ABSTRACT

A housing encloses a supply of oil and has opposite end portions which support an input shaft and an output shaft in axial alignment. A series of interfitting annular clutch plates and discs provide for connecting the input shaft to the output shaft and a series of interfitting annular brake plates and discs provide for braking the output shaft to the housing in response to axial movement of a non-rotating fluid actuated piston supported within the housing concentrically with the output shaft. An oil recirculating impeller is formed as a part of the output shaft and has vanes which extend generally axially through both the clutch and brake discs and the piston. The inlet of the impeller is positioned between the brake plates and the output end portion of the housing and receives oil through circumferentially spaced passages defined between lugs which extend from the housing and support the brake plates.

8 Claims, 2 Drawing Figures

1

CLUTCH-BRAKE UNIT

BACKGROUND OF THE INVENTION

The present invention is directed to an improved clutch-brake unit of the type disclosed in U.S. Pat. No. 3,638,773 which issued to the assignee of the present invention. In such a unit, it has been found desirable to provide for a construction which is compact in overall size and which is simple in assembly in order to minimize the cost of the unit and to simplify servicing of the unit in the field in addition to providing for using the unit as part of a drive train which occupies a minimum of space. It is also important to provide for forcing oil outwardly between the interfitting clutch plates and discs and the interfitting brake plates and discs when starting and stopping the output shaft to minimize wear of the plates and discs and to provide them with maximum service life.

The oil recirculation is accomplished in the clutch-brake unit shown in the above patent by the use of two opposing impellers formed as part of the output shaft. One impeller is located within the set of clutch plates and discs, and the other impeller is located within the set of brake plates and discs. The impellers have axially spaced opposing inlets through which oil is supplied to the impellers. There have also been clutch units which have been either developed or proposed and which incorporate some form of impeller means for recirculating oil between a series of clutch plates and discs. For example, a variable speed clutch incorporating an oil recirculating impeller on the input shaft is disclosed in abandoned application Ser. No. 690,124, filed Dec. 13, 1967. Similar type clutches having oil recirculating systems are disclosed in U.S. Pats. Nos. 2,869,701 and 3,202,253.

SUMMARY OF THE INVENTION

The present invention is directed to an improved clutch-brake unit which provides the above mentioned desirable features of a compact construction, simplicity of assembly and positive recirculation of oil between the clutch plates and discs and the brake plates and discs during starting and stopping of the output shaft. In general, these features are primarily provided by a clutch-brake unit which has an output shaft including a single oil recirculating impeller extending through both the clutch set of plates and discs and the brake set of plates and discs and which also has an inlet located between the non-rotating brake plates and the output end portion of the housing where the oil is subjected to minimum centrifugal action. Additional features and advantages of the invention will be apparent from the following description, the accompanying drawing and the appended claims.

DESCRIPTION OF THE PREFERRED EMBODIMENT

Figure 1:
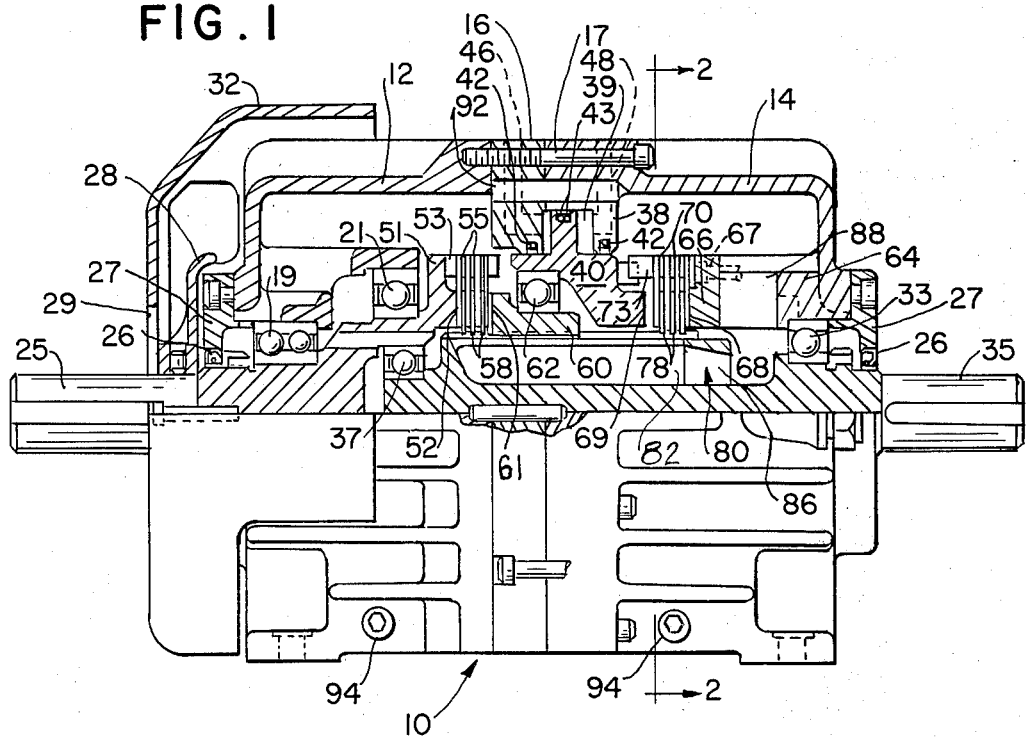
FIG. 1 is a side elevational view of a clutch-brake unit constructed in accordance with the invention and with the upper portion of the unit in axial section to show the internal construction of the unit.
Figure 2:
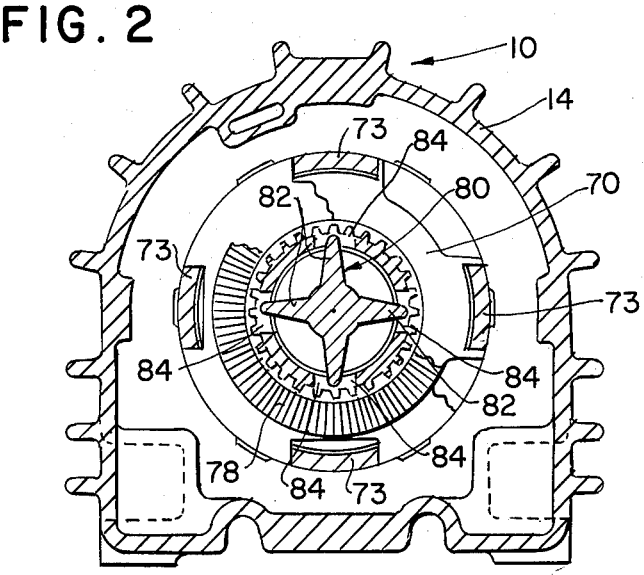
FIG. 2 is a radial section taken generally on the line 2—2 of FIG. 1.

The clutch-brake unit shown in FIGS. 1 and 2, includes a ribbed housing 10 formed by a first or input end portion 12, a second or output end portion 14 and an intermediate portion 16 positioned between the end portions 12 and 14. The end portions 12 and 14 and the intermediate portion 16 are secured or clamped together by a series of peripherally spaced, axially extending screws 17. The end portion 12 of the housing 10 has a set of counterbores which receive a set of axially spaced antifriction ball bearings 19 and 21, and an input shaft 25 is rotatably supported by the bearings in a manner similar to that shown in above mentioned U.S. Pat. No. 3,638,773. The input shaft 25 is adapted to be driven continuously by some form of a prime mover such as an electric motor.

An annular seal 26 is retained within an annular end cap 27 mounted on the end portion 12 of the housing 10, and forms a fluid-tight seal with the input shaft 25 for retaining a supply of oil within the housing 10. A centrifugal type air impeller 28 is mounted on the input shaft 25 adjacent the cap 27 and receives air through an inlet 29 within a cowling-like housing 32 mounted on the end portion 12 of the housing 10. The air impeller 28 and its surrounding housing 32 are effective to direct a continuous flow of air generally axially along the outer ribbed surface of the housing 10 for conducting heat from the housing.

The output end portion 14 of the housing 10 has a counterbore which retains an antifriction ball bearing 33 for supporting an intermediate portion of an output shaft 35. The output shaft 35 is adapted to be connected to drive a machine which requires intermittent starting and stopping. The inner end portion of the output shaft 35 is supported by an antifriction ball bearing 37 which is retained within a cavity or counterbore formed within the inner end portion of the input shaft 25. Another annular rotating seal assembly 26 is retained by another annular end cap 27 secured to the output end portion 14 of the housing 10, and the seal assembly 26 engages the output shaft 35 to form a fluid-tight seal for retaining the oil within the housing 10.

The end portion 14 of the housing 10 is provided with an inwardly projecting annular flange 38 in which is formed an annular cylindrical chamber 39 positioned concentric with the output shaft 35. A non-rotating annular piston 40 is positioned within the chamber 39 for axial sliding movement and is retained therein by the intermediate portion 16 of the housing 10. A set of O-rings 42 are retained within corresponding grooves formed within the intermediate housing portion 16 and the inwardly projecting flange 38 of the housing end portion 14 and form fluid-tight seals with the adjacent corresponding cylindrical surfaces of the piston 40.

Another set of O-rings 43 are retained within a peripheral groove within the piston 40 and form a fluid-tight seal with the outer cylindrical surface of the chamber 39. A passage 46 is formed within the intermediate housing portion 16 and a similar passage 48 is formed within the flange 38 of the housing end portion 14 to provide for supplying a fluid such as air to the chamber 39 on opposite sides of the piston 40 so that the piston may be selectively moved in opposite axial directions within the housing 10.

The input shaft 25 includes an inner annular portion 51 which has a radial thrust surface 52 and supports a series of peripherally spaced and axially extending bars or lugs 53. A series of flat annular clutch plates 55 are supported by the lugs 53 for rotation with the input shaft 25 and are interspaced between a series of clutch discs 58 which are splined to the outer surface of the output shaft 25 as shown in FIG. 2 for rotation with the output shaft. An annular clutch member 60 is also splined to the outer surface of the output shaft 35 for axial movement relative to the output shaft and has a radial thrust surface 61 opposing the surface 52 on the input shaft portion 51. The clutch member 60 supports the inner race of an antifriction ball bearing 62 which has an outer race confined within a surrounding counterbore formed within the piston 40.

The output end portion 14 of the housing 10 includes a plurality of inwardly projecting lugs 64 which support an annular brake plate 66 secured by a set of peripherally spaced screws 67. The annular brake plate 66 has an inwardly facing radial thrust surface 68 which opposes a radial surface 69 of an inner annular thrust portion of the piston 40. A series of annular brake plates 70 are positioned between the opposing thrust surfaces 68 and 69 and are supported by a plurality of circumferentially spaced and inwardly projecting keys or lugs 73 formed as an integral part of the brake plate 66. The lugs 73 also engage an opposing set of projecting lugs formed as a part of the piston 40 to prevent rotation of the piston. The brake plates 70 interfit between a corresponding series of brake discs 78 which are splined to the outer surface of the output shaft 35.

The output shaft 35 includes an integrally cast elongated impeller 80. The impeller 80 has a plurality of four vanes 82 which are uniformly spaced and extend axially of the output shaft 35 in corresponding axial planes. However, if the input shaft 25 is always rotated in a single direction, each vane 82 may be constructed to have a slightly curved or helical configuration to provide for an additional axial flow of the oil within the passages defined between the vanes 82. The impeller 80 also has a plurality of four peripherally spaced slot-like outlets 84 which receive the outer edge portions of the corresponding vanes 82. The outlets 84 and the vanes 82 extend through the annular clutch discs 58 and continue through the piston 40 and through the brake discs 78. The impeller 80 has an annular inlet 86, and the oil within the housing 10 is supplied to the inlet 86 through a plurality of circumferentially spaced passages 88 which are defined between the projections or lugs 64 of the output end portion 14 of the housing 10.

During operation of the clutch-brake unit, the oil within the input end portion 12 of the housing 10 flows to the output end portion 14 through a set of large passages (not shown) located within the bottom portion of the housing 10. A set of smaller air vent passages 92 extend axially through the upper part of the intermediate housing portion 16 and through the inwardly projecting flange 38 of the housing end portion 14 around the piston chamber 39. A set of removable drain plugs 94 are provided within the bottom portion of the housing 10 to provide for draining oil from the housing 10, and a single larger plug (not shown) is provided within the upper portion of the housing 10 for adding a supply of oil to the housing. The positive outward flow of oil between the clutch plates and discs during starting of the output shaft 35 and between the brake plates and discs during stopping of the shaft 35, is highly desirable for minimizing wear of the plates and discs.

From the drawing and the above description, it is apparent that a clutch-brake unit constructed in accordance with the present invention, provides desirable features and advantages. For example, one important feature is provided by the construction of the output shaft 35 with the impeller 80 which extends not only through the set of interfitting clutch plates 55 and discs 58 but also through the set of interfitting brake plates 70 and discs 78. As a result, the single impeller 80 is effective to force oil outwardly between the clutch plates and discs during starting of the output shaft 35 and also outwardly between the brake plate and discs during stopping of the output shaft 35, as controlled by the axial movement of the piston 40. This construction of the oil recirculating impeller 80 and its extension within both of the clutch discs and the brake discs, provides for significantly reducing the spacing between the clutch and brake discs on the output shaft 35, resulting in a reduction of the overall length of the output shaft 35. This reduction of the shaft 35 provides for a significant reduction in the overall length of the housing 10 and thereby provides for a more compact clutch-brake unit.

Another important feature is provided by the location of the inlet 86 of the impeller 80 generally adjacent the output end portion 14 of the housing 10 and by directing the oil to the inlet through the circumferentially spaced passages 88. That is, the oil is supplied to the impeller 80 within a zone where there is a minimum centrifugal action on the oil within the housing. As a result, the oil flows into the impeller 80 with the minimum of resistance or cnetrifugal forces acting on the oil and thereby contributes to maximum oil recirculation. This zone of minimum centrifugal action on the oil is due primarily to the nonrotation of the brake plate 66 and its supporting lugs 64 and as a result of the periodic stopping of the output shaft 35.

An additional feature is provided by the arrangement of the piston 40 within the annular chamber 39 formed within the flange 38 of the output end portion 14 and the housing 10. This arrangement simplifies machining of the housing and permits a sub-assembly of the housing end portion 14 with all of its supporting components including the piston 40 which is then retained by the intermediate housing portion 16. The simplified machining and assembly of the clutch-brake unit provide for significantly reducing the cost of manufacturing the unit. It is also apparent that a set of circumferentially spaced and axially extending fail-safe springs may be positioned to apply a continuous force against the piston 40 in a direction to apply the brake in the event of a failure of fluid pressure within the passages 46 and 48.

While the form of clutch-brake unit herein described constitutes a preferred embodiment of the invention, it is to be understood that the invention is not limited to this precise structure, and that changes may be made therein without departing from the scope and spirit of the invention as defined in the appended claims.

The invention having thus been described, the following is claimed:

1. In clutch-brake unit including a housing for containing a supply of oil and having first and second opposite end portions, an input shaft rotatably supported by said first end portion of said housing, an output shaft rotatably supported by said second end portion of said housing and extending in axial alignment with said input shaft, a first series of interfitting clutch plates and clutch discs within said housing, said clutch plates mounted on said input shaft for rotation therewith and the interfitting said clutch discs mounted on said output shaft for rotation therewith, a second series of interfitting brake plates and brake discs positioned in axially spaced relation to said first series of clutch plates and discs, said brake discs mounted on said output shaft for rotation therewith and the interfitting said brake plates being supported for nonrotation by said housing, an annular actuating piston supported within said housing coaxial with said output shaft and for nonrotating axial movement, means connected to said piston for applying an axially compressive force to said first series of clutch plates and discs in response to movement of said piston in one axial direction to couple said input shaft with said output shaft, and means for applying an axially compressive force to said second series of brake plates and discs in response to movement of said piston in the other axial direction for braking said output shaft to said housing, the improvement comprising an oil pump impeller on said output shaft and including vane, means extending through said first series of clutch plates and discs and second series of brake plates and discs for supplying oil under pressure to said plates and discs upon rotation of said output shaft, said impeller having an inlet located generally between said second series of brake plates and discs and said second end portion of said housing, and means defining a passage for directing oil within said housing to said inlet of said impeller.

2. A clutch-brake unit as defined in claim 1 wherein said means for applying an axially compressive force include an anti-friction bearing positioned coaxially with said shafts, and said vane means of said impeller extend through said bearing.

3. A clutch-brake unit as defined in claim 1 wherein said annular actuating piston is disposed between said first series of clutch plates and discs and said second series of brake plates and discs, and said vane means of said impeller extend through said piston.

4. A clutch-brake unit as defined in claim 1 wherein said second end portion of said housing includes means defining a cylindrical chamber for receiving said piston, and said vane means of said impeller extend through said piston.

5. A clutch-brake unit as defined in claim 1 including a plurality of circumferentially spaced passages surrounding said inlet for directing oil to said impeller in a zone where centrifugal action on the oil is minimum.

6. A clutch-brake unit as defined in claim 5 wherein said second end portion of said housing includes an inwardly projecting portion cooperating to define said passages.

7. A clutch-brake unit as defined in claim 1 wherein said means for applying an axially compressive force include a sleeve member mounted on said output shaft for rotation therewith, spline means on said output shaft and supporting said sleeve member for axial movement between said first and second series of plates and discs, and said vane means of said impeller extend through said sleeve member.

8. In clutch-brake unit including a housing for containing a supply of oil and having a first and second opposite end portions, an input shaft rotatably supported by said first end portion of said housing, an output shaft rotatably supported by said second end portion of said housing and extending in axial alignment with said input shaft, a first series of interfitting clutch plates and clutch discs within said housing, said clutch plates mounted on said input shaft for rotation therewith and the interfitting said clutch discs mounted on said output shaft for rotation therewith, a second series of interfitting brake plates and brake discs positioned in axially spaced relation to said first series of clutch plates and discs, said brake discs mounted on said output shaft for rotation therewith and the interfitting said brake plates being supported for nonrotation by said housing, an annular actuating piston supported within said housing co-axial with said output shaft and for nonrotating axial movement, means connected to said piston for applying an axially compressive force to said first series of clutch plates and discs in response to movement of said piston in one axial direction to couple said input shaft with said output shaft, and means for applying an axially compressive force to said second series of brake plates and discs in response to movement of said piston in the other axial direction for braking said output shaft to said housing, the improvement comprising an oil pump impeller on said output shaft and including vane means extending within said first series of clutch discs for supplying oil under pressure to said first series of clutch plates and discs upon rotation of said output shaft, said vane means extending along said output shaft from said first series of clutch discs and continuing within second series of brake discs for supplying oil under pressure to said second series of brake plates and discs upon rotation of said output shaft, said impeller having an inlet located generally between said second series of brake discs and said second end portion of said housing, and means defining a passage for directing oil within said housing to said inlet of said impeller.

* * * * *

Disclaimer 3,924,715.—*Halsey W. Cory*, Fairfield, Ohio. CLUTCH-BRAKE UNIT. Patent dated Dec. 9, 1975. Disclaimer filed Oct. 19, 1984, by the assignee, *Force Control Industries, Inc.*

Hereby enters this disclaimer to claims 1-8 of said patent.
[*Official Gazette December 4, 1984.*]